(12) United States Patent
Swamy et al.

(10) Patent No.: US 11,710,328 B2
(45) Date of Patent: Jul. 25, 2023

(54) SYSTEMS AND METHODS FOR IDENTIFYING A PRESENCE OF A COMPLETED DOCUMENT

(71) Applicant: Capital One Services, LLC, McLean, VA (US)

(72) Inventors: Fnu Manjushri Srikanta Swamy, Karnataka (IN); Gowtham Guduru, McKinney, TX (US); Joshua Havens, Frisco, TX (US); Aaron Attar, Dallas, TX (US); Rahul Nowlakha, Sugar Land, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/576,214

(22) Filed: Jan. 14, 2022

(65) Prior Publication Data

US 2023/0154219 A1 May 18, 2023

(30) Foreign Application Priority Data

Nov. 12, 2021 (IN) .............................. 202141051964

(51) Int. Cl.
*G06V 30/41* (2022.01)
(52) U.S. Cl.
CPC .................................. *G06V 30/41* (2022.01)
(58) Field of Classification Search
CPC ...................................................... G06V 30/41
See application file for complete search history.

(56) References Cited

U.S. PATENT DOCUMENTS

| | | | |
|---|---|---|---|
| 7,181,427 B1 | 2/2007 | Defransesco et al. | |
| 7,433,891 B2 | 10/2008 | Haber et al. | |
| 8,095,396 B1 | 1/2012 | Zublin et al. | |
| 8,176,004 B2 | 5/2012 | Malaney et al. | |
| 8,527,402 B2 | 9/2013 | McDonald et al. | |
| 9,313,209 B2 | 4/2016 | Corr et al. | |
| 10,387,986 B2 | 8/2019 | Malone et al. | |
| 10,992,683 B2 | 4/2021 | Yaacoby et al. | |
| 2008/0183633 A1 | 7/2008 | Nagelvoort | |
| 2014/0019318 A1 | 1/2014 | Haberaecker et al. | |
| 2019/0236350 A1* | 8/2019 | Kozlovsky | G06V 10/96 |

* cited by examiner

*Primary Examiner* — King Y Poon
*Assistant Examiner* — Michael L Burleson
(74) *Attorney, Agent, or Firm* — Troutman Pepper Hamilton Sanders LLP; Christopher J. Forstner; John A. Morrissett

(57) ABSTRACT

Systems and methods for identifying a presence of a completed document are disclosed. The system may receive an image file from a client device associated with a first document, identify one or more image regions within the image file corresponding to a presence of one or more extractable data entries, selectively extract the one or more extractable data entries, and determine whether the one or more extractable data entries match one or more stored data entries. When the one or more extractable data entries match, the system may determine the status of the first document as completed. When the one or more extractable data entries do not match, the system may proactively replace one or more inconsistent extractable data entries with corresponding stored data entries to form a corrected first document, and generate a request for a client to verify the corrected first document.

20 Claims, 7 Drawing Sheets

SYSTEMS AND METHODS FOR IDENTIFYING A PRESENCE OF A COMPLETED DOCUMENT

CROSS REFERENCE TO RELATED APPLICATIONS

This application claims priority under 35 U.S.C. § 119 to Indian Patent Application No. 202141051964, filed Nov. 12, 2021, the entire contents of which is incorporated herein by reference in its entirety.

FIELD OF THE INVENTION

The disclosed technology relates to systems and methods for identifying a presence of a completed document. In particular, the disclosed technology relates to identifying a master document of a plurality of received documents, and verifying whether the master document has been completed by extracting data entries from the plurality of received documents and comparing extracted data entries from the plurality of received documents to the extracted data entries from the master document.

BACKGROUND

Traditionally, financial service providers offer loan underwriting services to automotive dealerships that sell vehicles to customers. Automotive dealerships typically aggregate loan-specific documents and provide them to the financial service provider through a service that receives the documents and performs data extraction from the documents to verify the presence of necessary terms and data about the customer to complete the underwriting process. However, the services currently employed by dealerships to upload loan documents and extract necessary data are costly, serve as a performance bottleneck during periods of high traffic, and have the disadvantage of not being able to provide real-time feedback to automotive dealerships about missing or incomplete documents.

Accordingly, there is a need for improved systems and methods for identifying a presence of a completed document. The system may provide real-time feedback to the automotive dealership regarding the absence of a necessary document, an incomplete document, an illegible document, or a secondary document inconsistent with a received master document. Embodiments of the present disclosure are directed to this and other considerations.

SUMMARY

Consistent with a disclosed embodiment, a system and method for identifying a presence of a completed document is disclosed. The system may include one or more processors and a memory in communication with the one or more processors and storing instructions that, when executed by the one or more processors, are configured to cause the system to perform operations consistent with the disclosed embodiments. For example, in some embodiments, the system may store a plurality of data entries associated with a first document. The system may receive, from a client device, an image file associated with the first document. The system may extract, from the image file, one or more extractable data entries based on applying a data extraction technique. The system may normalize the one or more extractable data entries. The system may determine whether the one or more extractable data entries match the stored data entries beyond a predetermined threshold of similarity. The system may identify one or more incomplete data entries based on the one or more stored data entries of the plurality of stored data entries not matching the one or more extractable data entries beyond the predetermined threshold of similarity. The system may proactively complete the plurality of stored data entries based on replacing the one more incomplete data entries with one or more completed data entries, wherein the one or more completed data entries may be based on the one or more normalized extractable data entries.

Consistent with the disclosed embodiments, a system for identifying a presence of a completed document is disclosed. The system may include one or more processors and a memory in communication with the one or more processors and storing instructions that, when executed by the one or more processors, are configured to cause the system to perform operations consistent with the disclosed embodiments. For example, in some embodiments, the system may receive an image file from a client device associated with a first document. The system may identify one or more image regions within the image file corresponding to a likely presence of one or more extractable data entries. The system may selectively extract one or more extractable data entries based on applying a data extraction technique on the identified one or more image regions. The system may determine a status of the first document by determining whether the one or more extractable data entries match one or more stored data entries beyond a predetermined threshold of similarity. When the one or more extractable data entries match the one or more stored data entries beyond the predetermined threshold of similarity, the system may determine the status of the first document as completed.

Consistent with the disclosed embodiments, a system for identifying a presence of a completed document is disclosed. The system may include one or more processors and a memory in communication with the one or more processors and storing instructions that, when executed by the one or more processors, are configured to cause the system to perform operations consistent with the disclosed embodiments. For example, in some embodiments, the system may receive a plurality of image files form a client device, each of the plurality of image files associated with a respective document of a plurality of documents. The system may identify a first image file as a master document. The identification may be based on identifying a first image region within the first image file and extracting at least one master document identifier from the first image region. Following the identification of the master document, the system may extract one or more first data entries from the master document and normalize the one or more first data entries. The system may then extract one or more second data entries from each respective document of the plurality of documents other than the master document. The system may normalize the one or more second data entries, and determine whether the normalized one or more first data entries the normalized one or more second data entries beyond a predetermined threshold of similarity. When at least one normalized second data entry does not match a corresponding normalized first data entry beyond the predetermined threshold of similarity, the system may transmit a message to the client device indicating a document of the plurality of documents inconsistent with the master document. When the normalized second data entries each match the corresponding normalized first data entries beyond the predetermined threshold of similarity, the system may determine a status of the master document as completed.

Consistent with the disclosed embodiments, methods for identifying a presence of a completed document are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

The accompanying drawings, which are incorporated and constitute a part of this specification, illustrate various embodiments and aspects of the disclosed embodiments and, together with the description, serve to explain the principles of the disclosed embodiments. In the drawings.

DETAILED DESCRIPTION

Figure 1:
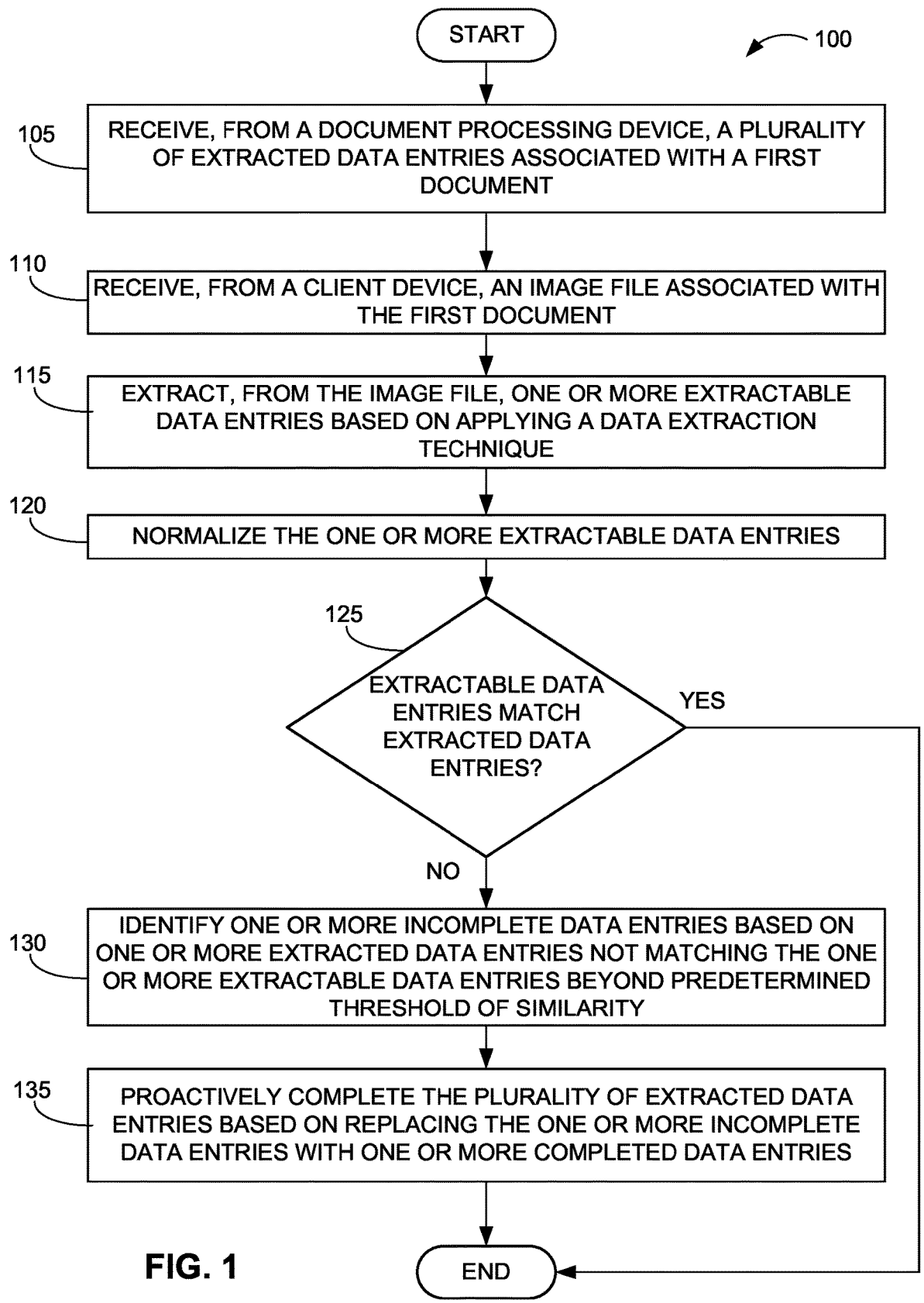
FIG. 1 is a flowchart of an exemplary method of proactively completing a document with one or more completed data entries, according to an example embodiment.

Examples of the present disclosure relate generally to identifying the presence of a completed document. More particularly, examples relate to systems and methods for determining a completed status of loan underwriting documents received from an automotive dealership system. The systems and methods described herein are necessarily rooted in computer technology as they relate to determining whether documents received from a client (e.g., automotive dealership) have been completed. In some instances, the system utilizes one or more of (i) a rules-based platform and (ii) a machine learning model to determine whether the documents received from a client (e.g., automotive dealership) are completed. For example, the system may extract one or more data entries from a plurality of documents, identify a master document, and compare extracted data entries from the master document to (i) one or more stored data entries and/or (ii) one or more extracted data entries from a document other than the master document to determine a status of the master document as completed. Machine learning models are a unique computer technology that involves training the models to complete a task, such as ranking or scoring a similarity between a first extracted data entry and a second extracted data entry to determine a match beyond a predetermined threshold by feeding the models with labeled data sets so the machine learning model can learn how to rank or score the training data sets and apply the same ranking or scoring techniques to unlabeled data sets. Importantly, examples of the present disclosure improve the speed and accuracy with which computers can determine the status of a document as completed based on autonomous data extraction and similarity matching to stored data based on the score the machine learning model generates.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a flow diagram illustrating an exemplary method 100 for proactively completing a first document with one or more completed data entries based on identifying one or more incomplete data entries in the first document received from a third-party document processing service, in accordance with certain embodiments of the disclosed technology. The steps of method 100 may be performed by one or more components of system 500 (e.g., document verification system 610, client system 620, third-party server 626, or financial service provider system 630), as described in more detail with respect to FIGS. 6-7.

In block 105, the system may store a plurality of data entries associated with a first document. The stored data entries may be received from a client (e.g., automotive dealership) in order to process a customer's loan application documents (e.g., retail installment contract, credit application, odometer statement, vehicle valuation document, etc.) for submission to a financial service provider (e.g., financial service provider system 630).

In block 110, the system may receive, from a client device (e.g., client system 620), an image file associated with the first document. The image file may include raw image data (e.g., unprocessed data) associated with the first document received from the third-party document processing service.

In block 115, the system may extract one or more extractable data entries from the image file based on applying a data extraction technique. For example, the system (e.g., document verification system 610) may employ optical character recognition to parse the image file and identify data entries within the image file. According to some embodiments, the system (e.g., document verification system 610) may additionally employ one or more of a rule-based platform (e.g., rule-based platform 790) and a machine learning model (e.g., machine learning model 795) to interpret the parsed text of the image file and determine data entries that have been entered into the first document as part of a customer loan application process. According to some embodiments, in order to extract the one or more extractable data entries from the image file, the system (e.g., document verification system 610) may first identify one or more image regions within the image file that correspond to a likely presence of one or more extractable data entries. For example, the system may identify and selectively parse only certain portions of the image file based on identifying certain features within a respective image region. For example, the system may selectively search for an image object associated with a likely presence of one or more extractable data entry. If the received image file is of a driver's license, passport, or government ID, the system may identify an image object associated with an image of a human face, and selectively search areas of the document nearby the image object to extract one or more extractable data entries. Likewise, the image object may be a subject header associated with the subject of the first document (e.g., a header of "master service agreement" may indicate to the system of a likely presence of extractable data entries immediately adjacent or below the identified header). In some embodiments, extracting one or more extractable data entries may include identifying a signature block within the image file and verifying a presence of a signature associated with a client within the signature block. As part of extracting one or more extractable data entries, the system (e.g., document verification system 610) may selectively sample portions of the document image for optical character recognition and determine a legibility quotient for each sampled portion of the document image. If at least one of the portions sampled by the system results in a legibility quotient below a predetermined threshold, the document may be identified as illegible, and a request for the client device to reupload the image file may be generated and transmitted to the client device (e.g., client system 620). For example, the system may segment the file image into several segments, and selectively OCR one or more words from each segment to determine the legibility quotient for each segment of the image. If any of the segments have a calculated legibility quotient less than a predetermined threshold, the system may generate a request for the document to be reuploaded by the client system.

In block 120, the system may normalize the one or more extractable data entries. For example, if the extractable data entry comprises a social security number ("SSN") in the form 123-45-7890, it may be normalized to 123457890 according to a business ruleset (e.g., rule-based platform 790). The rule-based platform may include standardization routines for commonly detected data types. For example, the rule-based platform may include instructions to remove all punctuation from an extracted phone number (e.g., (441) 958-3321 would become 4419583321). As a further non-limiting example, the rule-based platform may cause the system (e.g., document verification system 610) to normalize an extractable data entry comprising a street address by formatting it to observe United States Postal Service (USPS) postal addressing standards. USPS postal addressing standards include standardized abbreviations for common street markers such as "Ave." for Avenue and "St." for Street. Accordingly, the business ruleset may format extractable data entries including postal addresses to observe these standards.

According to some embodiments, the system may identify and extract a data entry including a business name (e.g., Wally's Pawn Shop). The system may utilize one or more of a rule-based platform (e.g., rule-based platform 790) and/or a machine learning model (e.g., machine learning model 795) to convert the business name into a normalized street address. In some embodiments, the system may verify the generated address by querying one or more third party sources of data (e.g., third party server 626). In some embodiments, the system may identify and extract a data entry including a GPS coordinate. The system may standardize the GPS coordinate data entry by determining a corresponding in a similar manner as described above with respect to a business name.

According to some embodiments, the system may normalize the one or more extractable data entries based on determining whether the one or more extractable data entries comply with one or more stored policy (e.g., policies stored on financial service provider repository 632). For example, each extractable data entry may be compared to policies stored on the financial service provider repository 632 to determine whether the extractable data entries complies with the stored policies. As an example, the system may extract the mileage associated with an automobile loan. If the extracted mileage count is greater than, for example, 70,000 miles, the system may verify that a second extractable data entry is associated with the selection of a gap insurance policy. If the system determines the second extractable data entry is associated with the selection of a gap insurance policy, the system may identify an error based on a policy stored on financial service provider repository 632 that states that gap insurance may not be provided for a vehicle that has an odometer reading of 70,000 miles or greater.

According to some embodiments, the system may identify and extract a data entry including a vehicle identification number (VIN). Based on extracting a VIN, the system may normalize the extractable data entry by querying a third-party data source (e.g., third-party server 626) to determine additional information associated with the VIN. For example, the system may receive, based on the query to the third-party source, that the VIN is associated with a specific vehicle model, trim, color, package, etc. Each of the additional pieces of information may be added to the one or more extracted data entries corresponding to the one or more documents received by the system. For example, upon querying the third-party source for information regarding the extracted VIN, the system may receive odometer data for a vehicle associated with the extracted VIN. The odometer data may be used to verify, for example, whether an odometer statement document includes a correct odometer entry for the vehicle associated with the extracted VIN.

According to some embodiments, the system may receive a plurality of documents. The plurality of documents and/or extractable data entries may be in a non-standard format, or otherwise in a different format than for the other documents uploaded to the system. Accordingly, the system (e.g., document verification system 610) may convert all the uploaded documents and extractable data entries into a standardized format. According to some embodiments, documents received by the system may be stored as a PDF file, a PNG image file, a TIFF image file, and/or a JPG image file. According to some embodiments, each file may be converted into a standardized format (e.g., a format selected from PDF, TIFF, JPG, and or PNG) as part of the processing of the document image.

According to some embodiments, the normalization of one or more extractable data entries may further include querying a third-party (e.g., third-party server 626) to identify more data associated with a respective extractable data entry. For example, if the system identifies and extracts a data entry including a social security number, the system may query a third party source (e.g., third-party server 626) to identify previous loan information associated with the social security number. If the customer is requesting a modification or refinance of an existing loan product, the system may identify previous loan details based on querying the third-party data source using the extracted social security number.

In decision block 125, the system may determine whether the one or more extractable data entries match the stored data entries beyond a predetermined threshold of similarity. For example, the system may use one or more of rule-based platform (e.g., rule-based platform 790) and a machine learning model (e.g., machine learning model 795) to determine whether the one or more extractable data entries match the stored data entries. For example, the stored data entries might include a credit rating from a first credit bureau, while the extractable data entries may include a credit rating from a second credit bureau that has a different standard rating system. Accordingly, the system may employ one or more of the rule-based platform and/or machine learning model to normalize the credit rating of the first credit bureau and the second credit bureau into a standard format and directly compare the normalized credit scores to determine whether the entries match within a predetermined level of similarity. According to some embodiments, when the first and second are within 10 points on a standardized credit scale, the system may determine that the first and second normalized credit scores match beyond a predetermined threshold of similarity.

In block 130, the system may identify one or more incomplete data entries based on one or more stored data entries of the plurality of stored data entries not matching the one or more extractable data entries beyond the predetermined threshold of similarity. For example, the system may compare the stored data entries with the one or more normalized extractable data entries processed by the system (e.g., document verification system 610) and received from the client (e.g., client system 620). The system may identify an incomplete data entry when the system identifies a normalized extractable data entry that does not have a corresponding matching stored data entry beyond the predetermined threshold of similarity.

In block 135, the system may proactively complete the plurality of stored data entries by replacing the one or more incomplete data entries with one or more completed data entries. The one or more completed data entries may be based on the one or more normalized extractable data entries. For example, the system may have identified that the stored data entries has an incomplete entry associated with a customer social security number (SSN). The incomplete data entry may be incomplete due to the stored data entry being illegible, incomplete, or otherwise missing from the document. However, the system may have identified a social security number as part of the raw image data received from the client device (e.g., client system 620). Accordingly, after normalizing the received SSN as described above with respect to the normalization step, the system may replace the incomplete data entry with the normalized SSN entry from the one or more extractable data entries.

According to some embodiments, the system may identify at least one inconsistent data entry associated with the stored data entries. The system (e.g., document verification system 610) may compare the plurality of stored data entries to the one or more extractable data entries to determine an inconsistent data entry. When the system identifies an inconsistent data entry, the system may transmit to the client (e.g., client system, 620) a request to reprocess the first document. In some cases, the system may provide an identification of the inconsistent data entry to the client system to facilitate the reprocessing.

Figure 2:
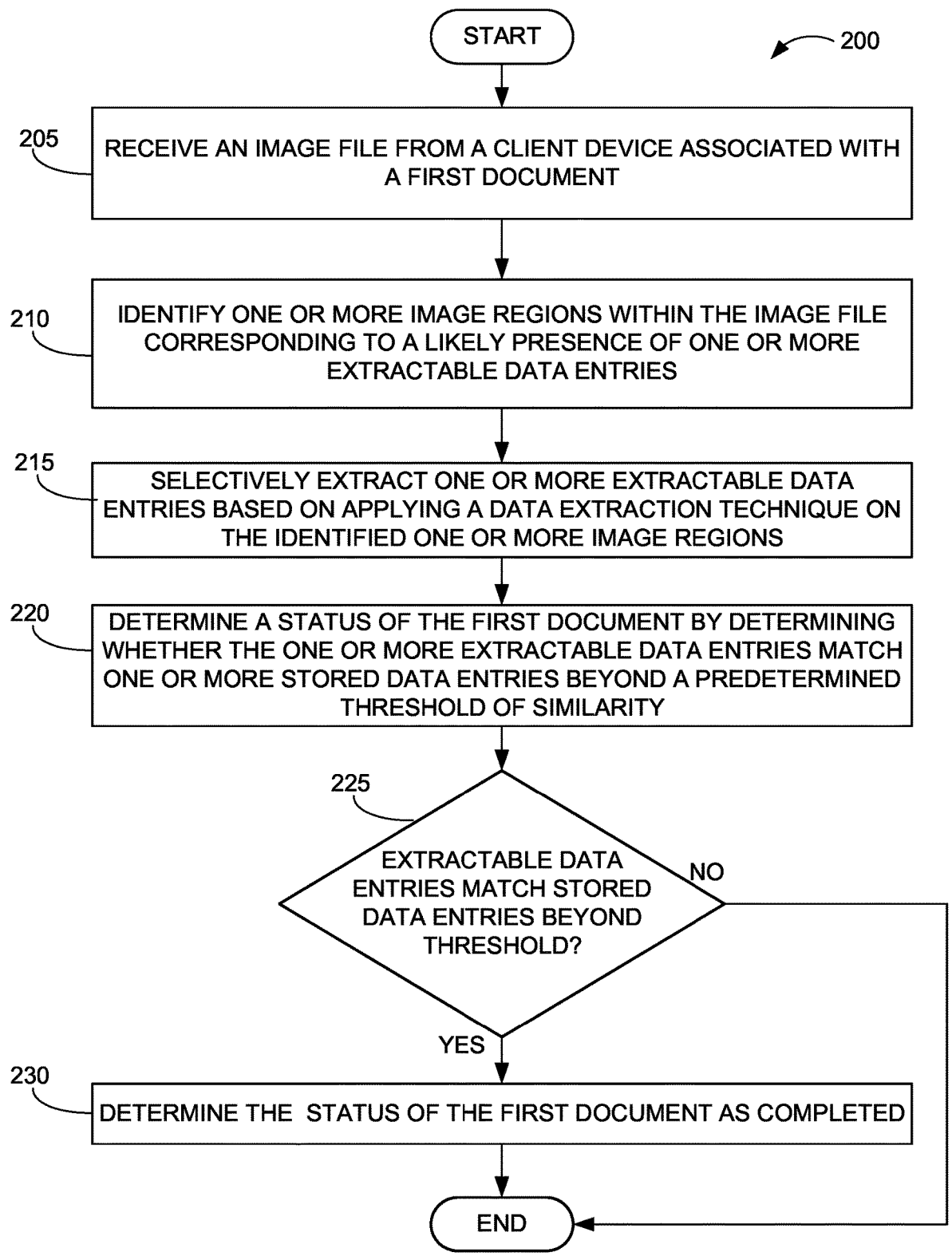
FIG. 2 is a flowchart of an exemplary method of determining a status of a first document by comparing one or more extractable data entries to one or more stored data entries, according to an example embodiment.

FIG. 2 is a flowchart of an exemplary method of determining a status of a first document by comparing one or more extractable data entries to one or more stored data entries, according to an example embodiment. The steps of method 200 may be performed by one or more components of system 500 (e.g., document verification system 610, client system 620, third-party server 626, or financial service provider system 630), as described in more detail with respect to FIGS. 6-7.

In block 205, the system (e.g., document verification system 610) may receive an image file from a client device associated with a first document. This step is substantially similar to step 110 of method 100 and a full description is omitted here for brevity.

In block 210, the system (e.g., document verification system 610) may identify one or more image regions within the image file corresponding to a likely presence of one or more extractable data entries. According to some embodiments, in order to extract the one or more extractable data entries from the image file, the system (e.g., document verification system 610) may first identify one or more image regions within the image file that correspond to a likely presence of one or more extractable data entries. For example, the system may identify and selectively parse only certain portions of the image file based on identifying certain features within a respective image region. For example, the system may selectively search for an image object associated with a likely presence of one or more extractable data entry. If the received image file is of a driver's license, passport, or government ID, the system may identify an image object associated with an image of a human face, and selectively search areas of the document nearby the image object to extract one or more extractable data entries. Likewise, the image object may be a subject header associated with the subject of the first document (e.g., a header of "master service agreement" may indicate to the system of a likely presence of extractable data entries immediately adjacent or below the identified header). In some embodiments, extracting one or more extractable data entries may include identifying a signature block within the image file and verifying a presence of a signature associated with a client within the signature block. According to some embodiments, identifying an image region that corresponds to a likely presence of one or more extractable data entries may include segmenting the image into a plurality of image segments (e.g., dissecting the image into 4 image portions, 8 image portions, etc.) and determining a number of words present in each image segment. According to some embodiments, segments of the image having the highest number of detected words may be identified as regions that correspond to the likely present of one or more extractable data entries.

In block 215, the system (e.g., document verification system 610) may selectively extract one or more extractable data entries based on applying a data extraction technique on the identified one or more image regions. For example, the system may employ optical character recognition on the identified image regions to extract one or more data entries form the one or more image regions. As part of extracting one or more extractable data entries, the system (e.g., document verification system 610) may selectively sample portions of the document image for optical character recognition and determine a legibility quotient for each sampled portion of the document image. If at least one of the portions sampled by the system results in a legibility quotient below a predetermined threshold, the document may be identified as illegible, and a request for the client device to reupload the image file may be generated and transmitted to the client device (e.g., client system 620). For example, the system may segment the file image into a plurality of segments, and selectively OCR one or more words from each segment to determine the legibility quotient for each segment of the image. If any of the segments have a calculated legibility quotient less than a predetermined threshold, the system may generate a request for the document to be reuploaded by the client system.

In block 220, the system may determine a status of the first document by determining whether the one or more extractable data entries match one or more stored data entries beyond a predetermined threshold of similarity. For example, the system (e.g., document verification system 610) may have stored on a related system repository (e.g., document verification system repository 612) stored data entries corresponding to the information that should be included in a completed first document. For example, the repository may include information such as a customer's name, date of birth, social security number (SSN), driver's license number, government ID number, and the like. According to some embodiments, document verification system may also query a third-party source for stored data entries (e.g., third-party server 626). In some embodiments, the system may additionally query and/or access data stored by a financial service provider (e.g., financial service provider system 630) associated with the respective customer. Data stored by the financial service provider may include the information referenced above, as well as information related to financing terms as part of the loan application process (loan amount, interest rate, repayment schedule, etc.), vehicle information associated with the automotive loan (e.g., VIN, appraisal, etc.), and the like.

In decision block 225, the system may determine a status of the first document based on whether the one or more extractable data entries match the one or more stored data entries beyond the predetermined threshold of similarity. When there is a match beyond the predetermined threshold of similarity between the extractable data entries and the one or more stored data entries, the system may determine the status of the first document as completed in block 230. According to some embodiments, when at least one of the extractable data entries is inconsistent with the one or more stored data entries, the system may determine the status of the first document as inconsistent. Responsive to an inconsistent status determination, the system may proactively replace one or more inconsistent data entries of the one or more extractable data entries with a corresponding stored data entry to generate a corrected first document. The system may additionally generate and transmit a message to the client device (e.g., client system 620) graphically identifying the replaced one or more inconsistent extractable data entries of the one or more extractable data entries and a request to verify the corrected first document.

Figure 3:
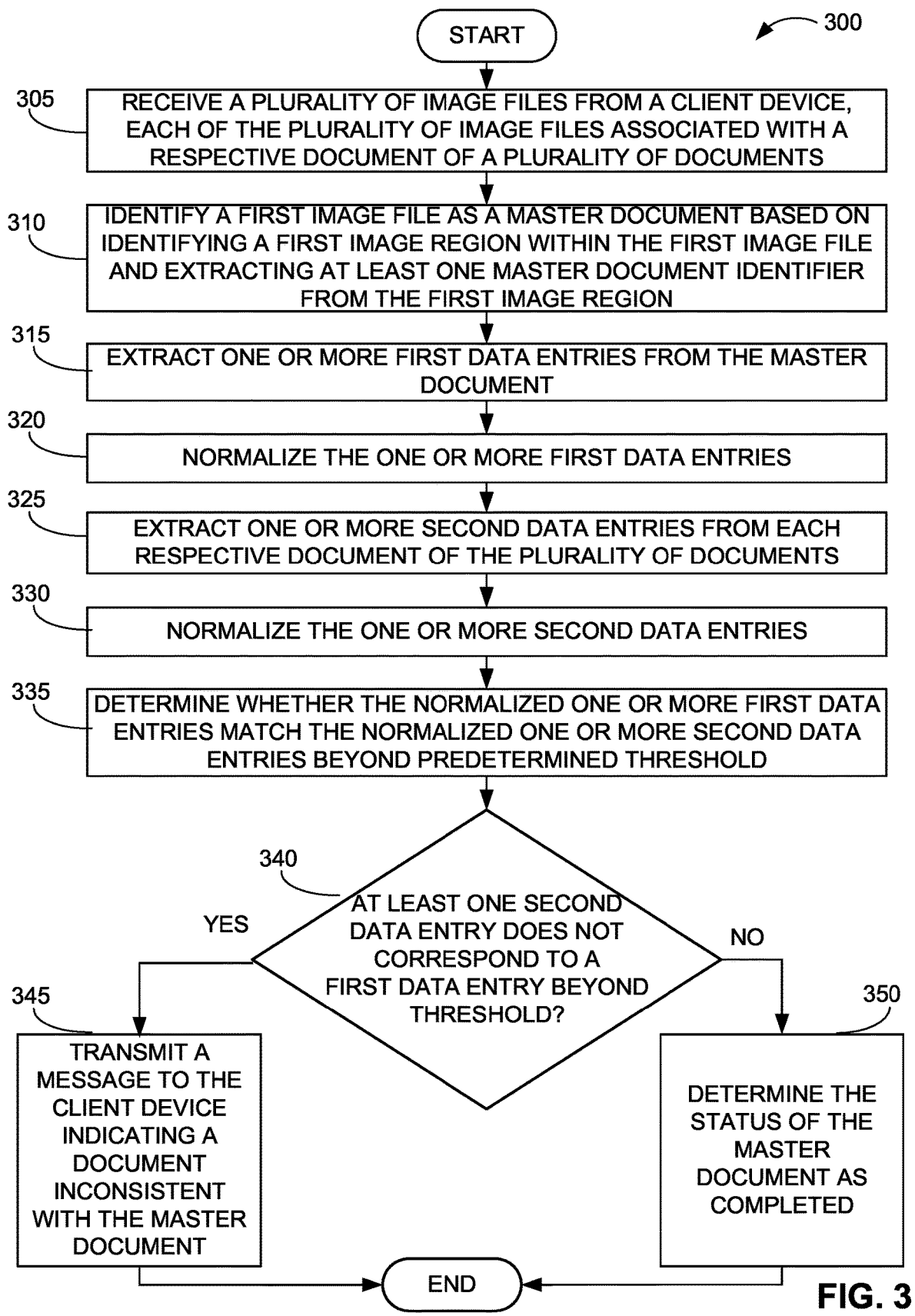
FIG. 3 is a flowchart of an exemplary method of determining a status of a first document by identifying a master document, extracting one or more first data entries from the master document, and determining whether at least one normalized second data entry extracted from a second document does not match a corresponding first data entry, according to an example embodiment.

FIG. 3 is a flowchart of an exemplary method of determining a status of a first document by identifying a master document, extracting one or more first data entries from the master document, and determining whether at least one normalized second data entry extracted from a second document does not match a corresponding first data entry, according to an example embodiment. The steps of method 300 may be performed by one or more components of system 500 (e.g., document verification system 610, client system 620, third-party server 626, or financial service provider system 630), as described in more detail with respect to FIGS. 6-7.

In block 305, the system may receive a plurality of image files from a client device. Each of the plurality of image files may be associated with a respective document of a plurality of documents.

In block 310, the system may identify a first image file as a master document. The identification may be based on identifying a first image region within the first image file and extracting at least one master document identifier from the first image region. For example, the first image region may be a top portion of the first page of a document, where a title is typically found. The master document identifier may include a subject header or title of the document. For example, the master document identifier may include a phrase such as "Service Contract," "Service Agreement," "Master Agreement," "Installment Contract" and the like. The system may identify the master document identifier using one or more of a rule-based platform (e.g., rule-based platform 790) and a machine learning model configured to identify master document identifiers based on labeled training sets (e.g., machine learning model 795).

In block 315, the system may extract one or more first data entries from the master document. Block 315 is substantially similar to block 115 and a full description is omitted here for brevity.

In block 320, the system may normalize the one or more first data entries. Block 320 is substantially similar to block 120 and a full description is omitted here for brevity.

In block 325, the system may extract one or more second data entries from each respective document of the plurality of documents. Block 325 is substantially similar to block 315 and block 115, and a full description is omitted here for brevity.

In block 330, the system may normalize the one or more second data entries. Block 330 is substantially similar to block 320 and block 120, and a full description is omitted here for brevity.

In block 335, the system may determine whether the normalized one or more first data entries match the normalized one or more second data entries beyond a predetermined threshold of similarity. For example, the system may identify normalized first data entries from the master document and corresponding normalized second data entries from the plurality of documents and determine whether each normalized data entry pair are match beyond a predetermined threshold. For example, a first data entry such a social security number may be compared to a second data entry corresponding to a social security number. The social security number extracted from the master document may be determined to be match to a second social security number when each digit of the nine digit number are an exact match. Before first data entries and second data entries may be normalized before the comparison to facilitate the determinization.

In decision block 340, the system may determine whether at least one second data entry does not correspond to a first data entry. Decision block 340 may be substantially similar to decision block 225, and a full description is omitted here for brevity.

In response to at least one second data entry not matching a corresponding first data entry beyond the predetermined threshold of similarity, the system may transmit a message to the client device indicating a document inconsistent with the master document in block 345. For example, the system may identify a respective second document from which the inconsistent second data entry was extracted, and determine the respective second document as the inconsistent document. In response to each normalized first data entry matching a corresponding normalized second data entry beyond the predetermined threshold of similarity, the system may determine the status of the master document as completed in block 350.

Figure 4:
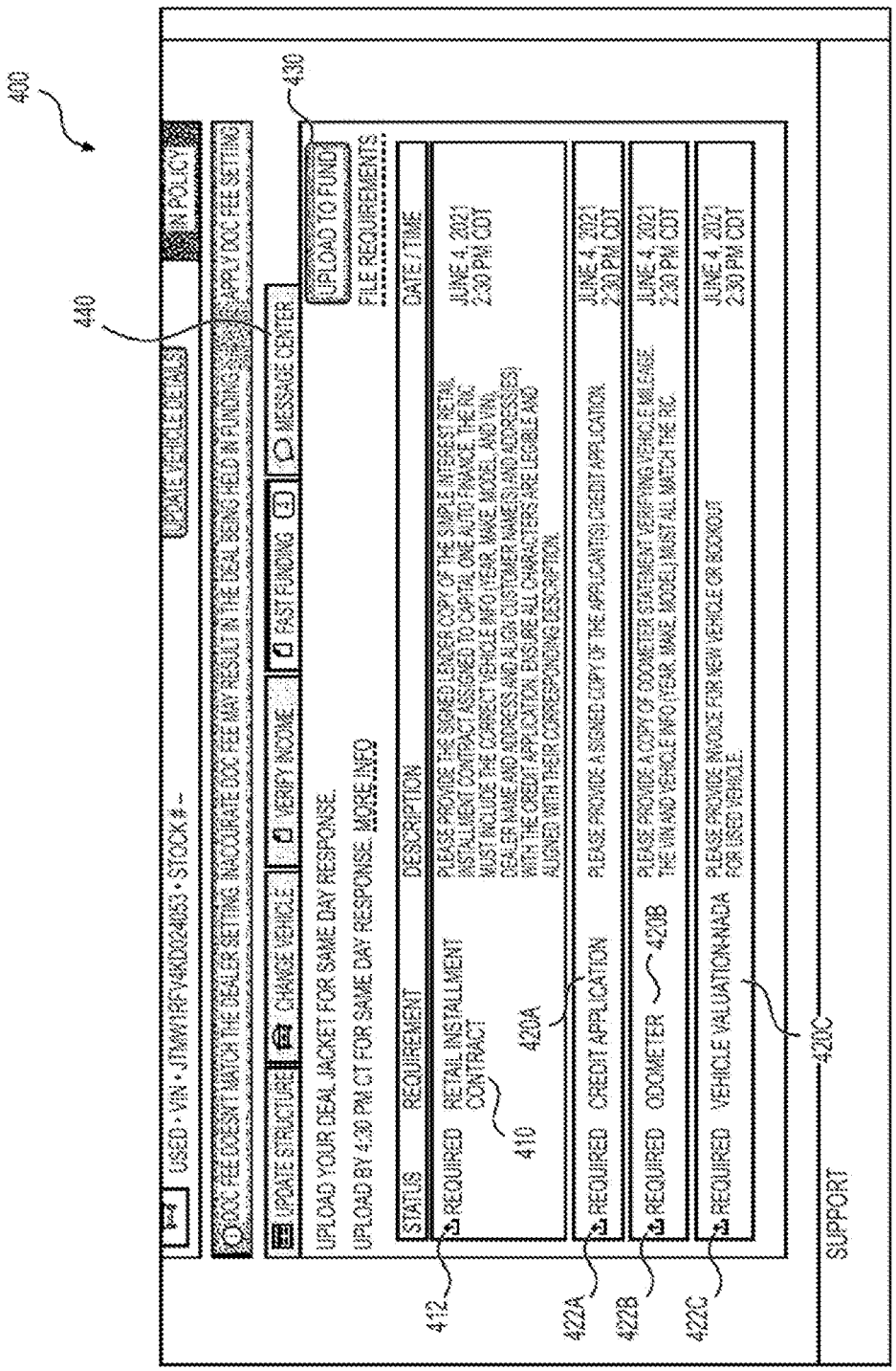
FIG. 4 depicts a representative document processing GUI provided to a client device, according to an example embodiment.

FIG. 4 depicts a representative document processing GUI provided to a client device, according to an example embodiment. The exemplary GUI 400 may be generated by one or more components of system 500 (e.g., document verification system 610, client system 620, third-party server 626, or financial service provider system 630), as described in more detail with respect to FIGS. 6-7. The client device may be presented with GUI 400 in order to aid the upload of the one or more image files corresponding to one or more documents for approval of a loan application. Once uploaded, the system may present to the client (e.g., via client system 620) the one or more documents that have been uploaded to system 500. Upon uploaded, the system may analyze each document to identify the document type. For example, document 410 may be identified as a "retail installment contract" based on identifying one or more image regions of interest, and selectively applying a data extraction technique on the one or more image regions of interest. For example, the system may identify the retail installment contract as the "master document" by identifying a subject header region of the document, and selectively applying optical character recognition to a title of the agreement. The rule-based platform and/or machine learning model of the system (e.g., rule-based platform 790 and/or machine learning model 795) may aid the system in identifying the document as a master document. GUI 400 may also provide an option to upload (or re-upload) a respective document by clicking or otherwise interacting with upload button 412. Similarly, GUI 400 may enable the upload and identification of one or more additional documents 420A, 420B, 420C that provide supporting documentation to master document 410. Upload buttons for the one or more supporting documents are provided as 422A, 422B, and 422C. Once a client has confirmed that all required documents have been uploaded to system 500, the client device may interact with button 430 to indicate that all necessary documents have been uploaded and are ready to be submitted to system 500 for the verification of a completed master document. GUI 400 may also include an additional tab providing a message center 440, that may provide the client (e.g., via client system 620) instant feedback regarding the status of the received loan application. For example, after the system (e.g., via document verification system 610) verifies the successful completion of the application, the status may be indicated to client system 620 through message center 440. Similarly, the client may be notified via message center 440 when one or more documents need to be corrected, reuploaded, and/or include a data entry inconsistent with the identified master document.

According to some embodiments, GUI 400 may additionally be configured to rearrange the order of the uploaded documents (e.g., master document 410, and/or supporting documents 420A, 420B, 420C, etc.) based on the determined status of each respective document. For example, if the master document is determined to be inconsistent (e.g., as described with respect to FIG. 3), the system (e.g., document verification system 610) may generate a modified GUI 400 in which the identified inconsistent document is moved to the top of the page, highlighted, or otherwise indicated to the client that the respective document is inconsistent. Likewise, the system may generate modified GUI 400 that moves all documents having a "completed status" to the top of the GUI, while optionally highlighting each inconsistent document that needs either client verification or reupload.

Figure 5:
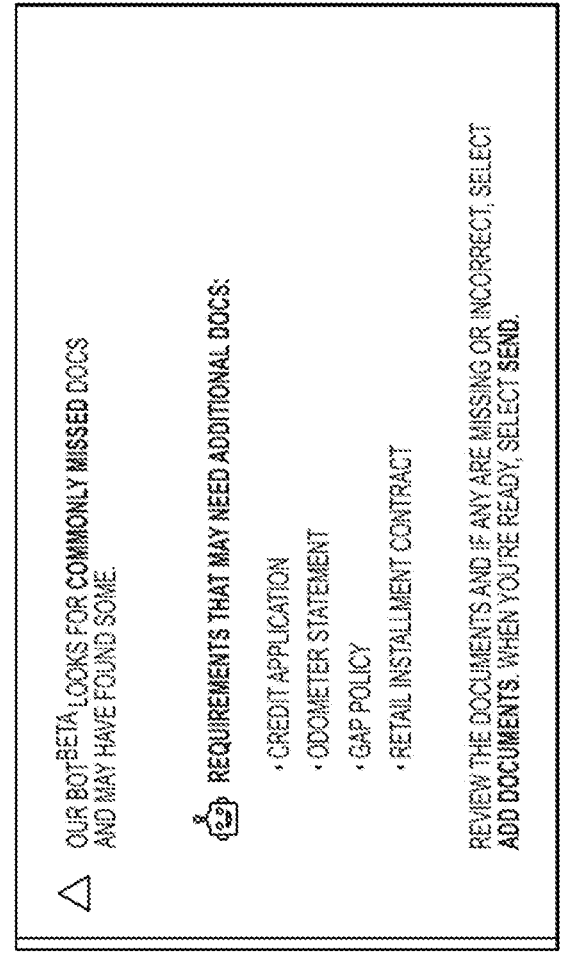
FIG. 5 depicts a representative document processing GUI provided to a client device, according to an example embodiment.

FIG. 5 depicts a popup and/or GUI 500 provided to a client device to notify the client that at least one document needs to be reuploaded, according to an example embodiment. Exemplary GUI 500 may be generated by one or more components of system 600 (e.g., document verification system 610, client system 620, third-party server 626, and/or financial service provider system 630). After at least one document is identified as needing to be reuploaded (e.g., when the document includes a data entry inconsistent with the master document or determined to be illegible), the system may generate and provide GUI 500 to the client (e.g., to client system 620). GUI 500 may be provided to the client as either part of GUI 400 (e.g., as part of message center 440), or in some embodiments, GUI 500 may be provided as a pop-up notification that is temporarily overlaid over GUI 400 after receiving an input from the client to upload the documents to the document verification system (e.g., document verification system 610).

Figure 6:
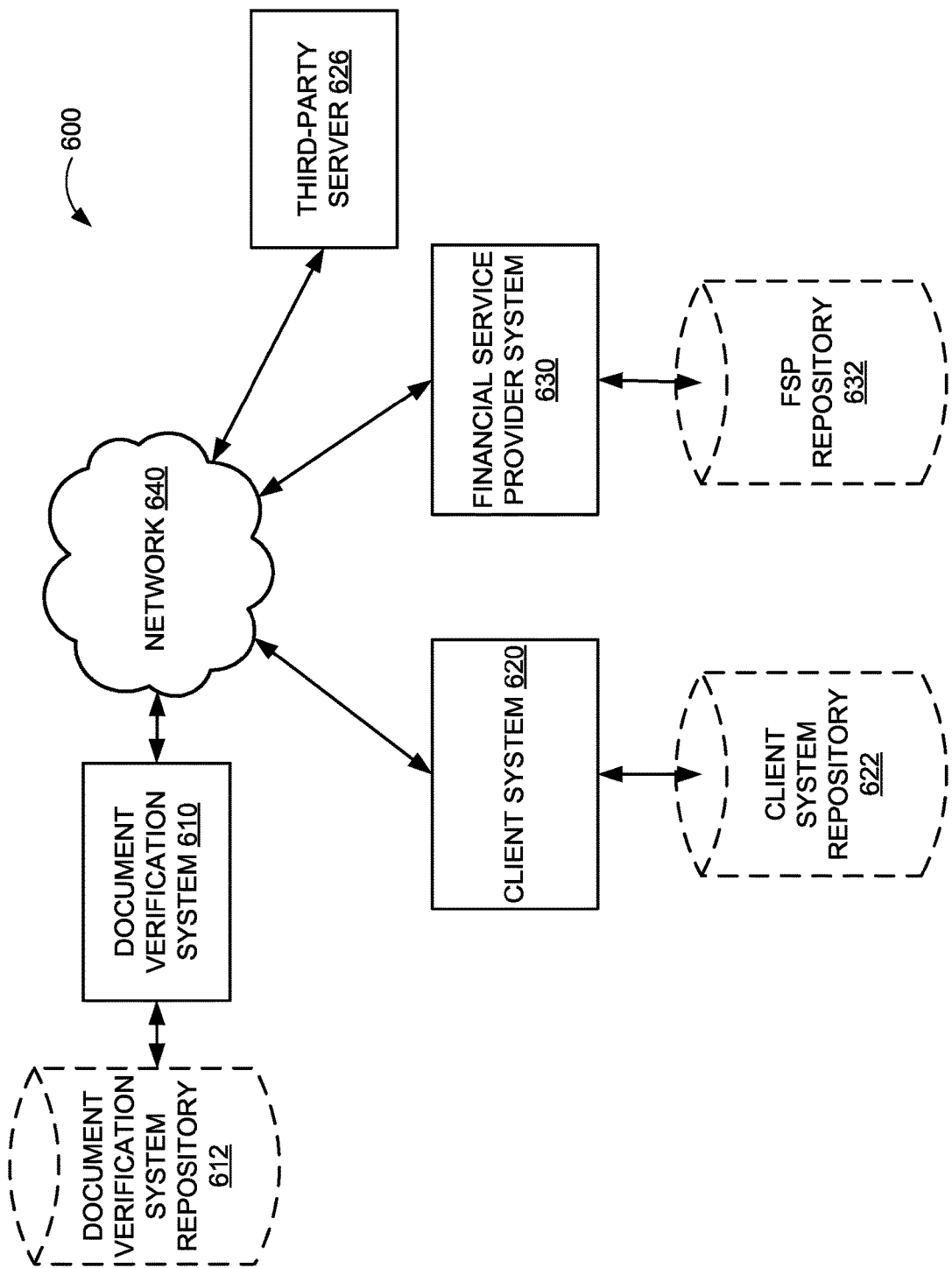
FIG. 6 illustrates an exemplary document verification system consistent with disclosed embodiments.

FIG. 6 illustrates an exemplary document verification system, according to an example implementation of the disclosed technology. The components and arrangements shown in FIG. 6 are not intended to limit the disclosed embodiments as the components used to implement the disclosed processes and features may vary. As shown, document verification system 610 may interact with a client system 620, third-party server 626, and financial service provider system 630 via a network 640. In certain example implementations, the document verification system 610 may include a document verification system repository 612, the client system 620 may include a client system repository 622, and the financial service provider 630 may include a financial service provider repository (FSP) 632.

In some embodiments, a client may operate the client system 620. The client system 620 can include one or more of a mobile device, smart phone, general purpose computer, tablet computer, laptop computer, telephone, PSTN landline, smart wearable device, voice command device, other mobile computing device, or any other device capable of communicating with the network 640 and ultimately communicating with one or more components of system 600. In some embodiments, the client system 620 may include or incorporate electronic communication devices for hearing or vision impaired users.

Clients may include individuals such as, for example, subscribers, customers, and/or associates of an entity, such as an automotive dealership who have requested, will request, or may request an approval of a loan package associated with obtaining financing for a vehicle. According to some embodiments, the client system 620 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 640 may be of any suitable type, including individual connections via the internet such as cellular or WiFi networks. In some embodiments, the network 640 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 640 may include any type of computer networking arrangement used to exchange data. For example, the network 640 may be the Internet, a private data network, virtual private network using a public network, and/or other suitable connection(s) that enable(s) components in the system 500 environment to send and receive information between the components of the system 500. The network 640 may also include a public switched telephone network ("PSTN") and/or a wireless network.

In accordance with certain example implementations of the disclosed technology, the document verification system 610 may include one or more computer systems configured to compile data from a plurality of sources, such as the client system 620, third-party server 626, financial service provider system 630, and optionally, document verification system repository 612, client system repository 622, and/or financial service provider repository 632. The document verification system 610 may correlate compiled data, analyze the compiled data, arrange the compiled data, generate derived data based on the compiled data, and store the compiled and derived data in a database such as the document verification system repository 612. According to some embodiments, the financial service provider repository 630 and/or the third-party server 626 may be a databases associated with an organization and/or a related entity that stores a variety of information relating to customers, transactions, and business operations. The document verification repository 612 may also serve as a back-up storage device and may contain data and information that is also stored on, for example, database 760, as discussed with reference to FIG. 7.

Figure 7:
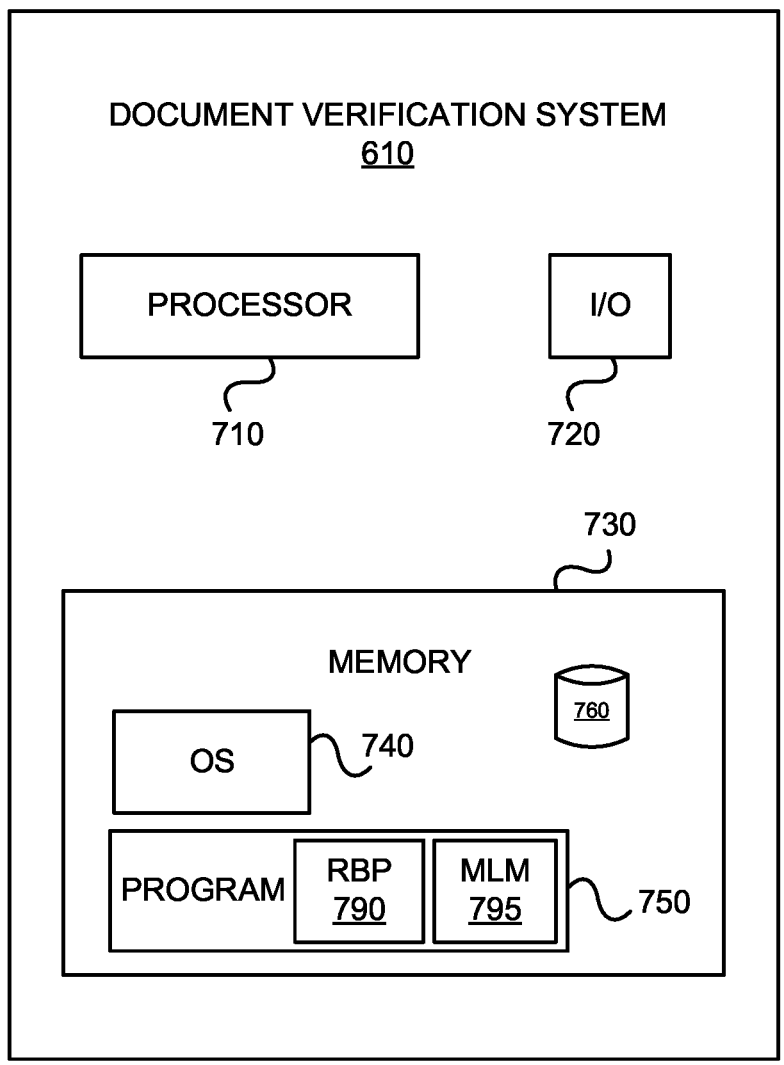
FIG. 7 is a component diagram of an exemplary document verification system.

FIG. 7 is a block diagram of an example document verification system 610 used to verify a completed status of one or more documents, according to an example implementation of the disclosed technology. According to some embodiments, the client system 620, third-party server 626, or financial service provider system 630, as depicted in FIG. 6 and described above, may have a similar structure and components that are similar to those described with respect to document verification system 610 shown in FIG. 7. As shown, the document verification system 610 may include a processor 710, an input/output ("I/O") device 720, a memory 730 containing an operating system ("OS") 740 and a program 750. In certain example implementations, the document verification system 610 may be a single server or may be configured as a distributed computer system including multiple servers or computers that interoperate to perform one or more of the processes and functionalities associated with the disclosed embodiments. In some embodiments document verification system 610 may be one or more servers from a serverless or scaling server system. In some embodiments, the document verification system 610 may further include a peripheral interface, a transceiver, a mobile network interface in communication with the processor 710, a bus configured to facilitate communication between the various components of the document verification system 610, and a power source configured to power one or more components of the document verification system 610.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 710 to communicate with other devices via wired or wireless networks, whether local or wide area, private or public, as known in the art. A power source may be configured to provide an appropriate alternating current (AC) or direct current (DC) to power components.

The processor 710 may include one or more of a microprocessor, microcontroller, digital signal processor, co-processor or the like or combinations thereof capable of executing stored instructions and operating upon stored data. The memory 430 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 730.

The processor 710 may be one or more known processing devices, such as, but not limited to, a microprocessor from the Pentium™ family manufactured by Intel™ or the Turion™ family manufactured by AMD™. The processor 410 may constitute a single core or multiple core processor that executes parallel processes simultaneously. For example, the processor 710 may be a single core processor that is configured with virtual processing technologies. In certain embodiments, the processor 710 may use logical processors to simultaneously execute and control multiple processes. The processor 710 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the document verification system 610 may include one or more storage devices configured to store information used by the processor 710 (or other components) to perform certain functions related to the disclosed embodiments. In one example, the document verification system 610 may include the memory 730 that includes instructions to enable the processor 710 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In certain example implementations, the program 750 that may include a rule-based platform 790 for determining normalization of one or more data entries, recognizing one or more image regions, and extracting one or more data entries, in accordance with a set of predefined rules. In some embodiments, the document verification system 610 may include a trained machine learning model 795 for determining normalization of one or more data entries, recognizing one or more image regions, and extracting one or more data entries. Moreover, the processor 710 may execute one or more programs 750 located remotely from the system 500 (such as the system shown in FIG. 6). For example, the system 500 may access one or more remote programs 750 (such as the rule-based platform 790 or the trained machine learning model 795), that, when executed, perform functions related to disclosed embodiments. According to some embodiments, the machine learning model may implement one or more of a recurrent neural network (RNN), a convolutional neural network (CNN), and a transformer to perform one or more steps of a method consistent with the present disclosure.

In one embodiment, the document verification system 610 may include a memory 730 that includes instructions that, when executed by the processor 710, perform one or more processes consistent with the functionalities disclosed herein. Methods, systems, and articles of manufacture consistent with disclosed embodiments are not limited to separate programs or computers configured to perform dedicated tasks. For example, the document verification system 610 may include the memory 730 that may include one or more programs 750 to perform one or more functions of the disclosed embodiments. For example, in some embodiments, the document verification system 610 may additionally manage generate a GUI (e.g., GUI 400) for use by the client system 620 via a program 750.

The memory 730 may include one or more memory devices that store data and instructions used to perform one or more features of the disclosed embodiments. The memory 730 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 730 may include software components that, when executed by the processor 710, perform one or more processes consistent with the disclosed embodiments. In some embodiments, the memory 730 may include a database 760 for storing related data to enable the document verification system 610 to perform one or more of the processes and functionalities associated with the disclosed embodiments.

The database 460 may include stored data relating to a status of each upload document (e.g., completed, inconsistent, illegible, etc.), a record of each of the one or more extracted data entries extracted from the one or more documents, and in certain embodiments, the extracted master document identifier. According to some embodiments, the functions provided by the database 460 may also be provided by a database that is external to the document verification system 610, such as the document verification system repository 612, as shown in FIG. 6.

The document verification system 610 may also be communicatively connected to one or more memory devices (e.g., databases) locally or through a network. The remote memory devices may be configured to store information and may be accessed and/or managed by the document verification system 610. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The document verification system 610 may also include one or more I/O devices 720 that may comprise one or more interfaces for receiving signals or input from devices and providing signals or output to one or more devices that allow data to be received and/or transmitted by the document verification system 610. For example, the document verification system 610 may include interface components, which may provide interfaces to one or more input devices, such as one or more keyboards, mouse devices, touch screens, track pads, trackballs, scroll wheels, digital cameras, microphones, sensors, and the like, that enable the document verification system 610 to receive data from a user (such as, for example, via the client system 620) or financial service provider system 630.

In example embodiments of the disclosed technology, the document verification system 610 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the document verification system 610 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Further-more, other implementations of the document verification system 610 may include a greater or lesser number of components than those illustrated.

Exemplary Use Case

The following exemplary use case describes just one example of a typical user flow pattern. It is intended solely for explanatory purposes and not in limitation. A client (e.g., an automotive dealership) may wish to submit a number of documents to the document verification system in order to facilitate loan approval for the purchase of a vehicle. The client may upload one or more image files (e.g., scanned documents) to the system. The system may parse the contents of the one or more uploaded documents and identify each document uploaded to the system. The system may additionally determine a master document which defines the terms of the loan agreement. The master document may include a signature block signed by a customer wishing to purchase a vehicle and apply for financing for said purchase. The system may verify that the master document is complete by verifying that the master document includes a customer signature, and may additionally extract one or more extractable data entries from the master document and each supporting document uploaded to the system. Additionally, the system may normalize each extracted data entry according to a standard business ruleset and/or a trained machine learning model. After normalization, the system may identify correlated data entries between the supporting documents and the master document. If the system identifies that one or more data entries from the supporting documents do not match (e.g., are inconsistent with) the data entries from the master document, the system may generate and transmit a notification to the client system identifying the one or more inconsistent data entries, their corresponding documents, and request that a corrected version of the document be uploaded to the system.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for identifying a presence of a completed document, the system comprising:
   one or more processors; and
   a memory in communication with the one or more processors and storing instructions that, when executed by the one or more processors, are configured to cause the system to:
      store a plurality of data entries associated with a first document;
      receive, from a client device, an image file associated with the first document;
      extract, from the image file, one or more extractable data entries based on applying a data extraction technique;
      normalize the one or more extractable data entries;
      determine whether the one or more extractable data entries match the stored data entries beyond a predetermined threshold of similarity;
      identify one or more incomplete data entries based on one or more stored data entries of the plurality of stored data entries not matching the one or more extractable data entries beyond the predetermined threshold of similarity; and
      proactively complete the plurality of stored data entries based on replacing the one or more incomplete data entries with one or more completed data entries, the one or more completed data entries based on the one or more normalized extractable data entries.

2. The system of claim 1, wherein the memory stores further instructions that, when executed by the one or more processors, are configured to cause the system to:
   identify at least one inconsistent data entry associated with the plurality of stored data entries based on comparing the plurality of stored data entries to the one or more extractable data entries; and
   transmit, to the document processing service, a request to reprocess the first document.

3. The system of claim 1, wherein the data extraction technique comprises optical character recognition.

4. The system of claim 3, wherein the data extraction technique further comprises a neural network model that receives the one or more extractable data entries as input.

5. The system of claim 1, wherein extracting the one or more extractable data entries further comprises identifying one or more image regions within the image file corresponding to a likely presence of the one or more extractable data entries.

6. The system of claim 5, wherein the one or more image regions are identified based on detecting an image object.

7. The system of claim 6, wherein the image object comprises an object selected from a subject header and a presence of an image of a human face.

8. The system of claim 1, wherein the memory stores further instructions that, when executed by the one or more processors, are configured to cause the system to:
   identify a signature block within the image file associated with the first document; and
   verify a presence of a signature associated with a client associated with the client device within the signature block.

9. A system for identifying a presence of a completed document, the system comprising:
   one or more processors; and
   a memory in communication with the one or more processors and storing instructions that, when executed by the one or more processors, are configured to cause the system to:
      receive an image file from a client device associated with a first document;
      identify one or more image regions within the image file corresponding to a likely presence of one or more extractable data entries;
      selectively extract one or more extractable data entries based on applying a data extraction technique on the identified one or more image regions;
      determine a status of the first document by determining whether the one or more extractable data entries match one or more stored data entries beyond a predetermined threshold of similarity; and
      when the one or more extractable data entries match the one or more stored data entries beyond the predetermined threshold of similarity, determine the status of the first document as completed.

10. The system of claim 9, wherein the memory stores further instructions that, when executed by the one or more processors, are configured to cause the system to:
   when the one or more extractable data entries do not match the one or more stored data entries beyond the predetermined threshold of similarity, determine the status of the first document as inconsistent.

11. The system of claim 10, wherein the memory stores further instructions that, when executed by the one or more processors, are configured to cause the system to:

proactively replace one or more inconsistent data entries of the one or more extractable data entries with a corresponding stored data entry to generate a corrected first document; and generate and transmit a message to the client device graphically identifying the replaced one or more inconsistent extractable data entries of the one or more extractable data entries and a request to verify the corrected first document.

12. The system of claim 9, wherein determining the status of the first document as completed further comprises identifying a signature block within the image file associated with the first document and verifying a presence of a signature associated with a client associated with the client device within the signature block.

13. The system of claim 9, wherein the one or more image regions are identified based on detecting an image object.

14. The system of claim 13, wherein the image object comprises an object selected from a subject header, a signature block, and a presence of an image of a human face.

15. A system for identifying a presence of a completed document, the system comprising:
one or more processors; and
a memory in communication with the one or more processors and storing instructions that, when executed by the one or more processors, are configured to cause the system to:
receive a plurality of image files from a client device, each of the plurality of image files associated with a respective document of a plurality of documents;
identify a first image file as a master document, the identification based on:
identifying a first image region within the first image file; and
extracting at least one master document identifier from the first image region;
extract one or more first data entries from the master document;
normalize the one or more first data entries;
extract one or more second data entries from each respective document of the plurality of documents other than the master document;
normalize the one or more second data entries;
determine whether the normalized one or more first data entries match the normalized one or more second data entries beyond a predetermined threshold of similarity;
when at least one normalized second data entry does not match a corresponding normalized first data entry beyond the predetermined threshold of similarity, transmit a message to the client device indicating a document of the plurality of documents inconsistent with the master document; and
when the normalized second data entries each match the corresponding normalized first data entries beyond the predetermined threshold of similarity, determine a status of the master document as completed.

16. The system of claim 15, wherein the first image region is identified based on detecting an image object.

17. The system of claim 16, wherein the image object comprises an object selected from a subject header, a signature block, and a presence of an image of a human face.

18. The system of claim 15, wherein determining the status of the master document as completed further comprises identifying a signature block within the first image file and verifying a presence of a signature associated with the client within the signature block.

19. The system of claim 15, wherein the memory stores further instructions that, when executed by the one or more processors, are configured to cause the system to generate and transmit a message to the client device identifying the at least one normalized second data entry not matching a normalized first data entry and a request to upload a corrected document associated with the at least one identified normalized second data entry.

20. The system of claim 15, wherein extracting one or more first data entries and extracting one or more second data entries further comprises extracting the one or more first data entries and the one or more second data entries using optical character recognition and inputting the one or more first data entries and one or more second data entries into a neural network.

* * * * *